US012100352B2

(12) United States Patent
Lai et al.

(10) Patent No.: US 12,100,352 B2

(45) **Date of Patent: *Sep. 24, 2024**

(54) DISPLAY PANEL AND DISPLAY DEVICE

(71) Applicant: Xiamen Tianma Micro-Electronics Co., Ltd., Xiamen (CN)

(72) Inventors: Qingjun Lai, Xiamen (CN); Yihua Zhu, Xiamen (CN); Jinjin Yang, Xiamen (CN); Ping An, Xiamen (CN)

(73) Assignee: Xiamen Tianma Micro-Electronics Co., Ltd., Xiamen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 18/182,216

(22) Filed: Mar. 10, 2023

(65) Prior Publication Data

US 2023/0215369 A1 Jul. 6, 2023

Related U.S. Application Data

(63) Continuation of application No. 17/512,683, filed on Oct. 28, 2021, now Pat. No. 11,626,069.

(30) Foreign Application Priority Data

May 17, 2021 (CN) ........................ 202110536427.3

(51) Int. Cl.

*G09G 3/3233* (2016.01)

*G09G 3/3266* (2016.01)

(52) U.S. Cl.

CPC ......... *G09G 3/3233* (2013.01); *G09G 3/3266* (2013.01); *G09G 2310/061* (2013.01);

(Continued)

(58) Field of Classification Search

CPC ............... G09G 3/3208; G09G 3/3233; G09G 3/3266; G09G 2300/0814;

(Continued)

(56) References Cited

U.S. PATENT DOCUMENTS 11,626,069 B2 * 4/2023 Lai ........................ G09G 3/3233 345/204

2023/0042966 A1 * 2/2023 Huangfu .............. G09G 3/3258

FOREIGN PATENT DOCUMENTS

CN 111489701 A * 8/2020 ........... G09G 3/3233

CN 111613177 A 9/2020

(Continued)

*Primary Examiner* — Stacy Khoo

(74) *Attorney, Agent, or Firm* — KILPATRICK TOWNSEND & STOCKTON LLP

(57) ABSTRACT

Disclosed are a display panel and a display device. The display panel includes a pixel circuit. In the pixel circuit, a reset device includes a first sub-transistor and a second sub-transistor, and a connection node between the first sub-transistor and the second sub-transistor is a second node; a compensation device includes a third sub-transistor and a fourth sub-transistor, a connection node between the third sub-transistor and the fourth sub-transistor is a third node; the pixel circuit includes a second capacitor and a third capacitor; two pole plates of the second capacitor are respectively connected to a line of first scan signal and the second node; two pole plates of the third capacitor are respectively connected to a line of second scan signal and the third node; and the second capacitor (C2) and the third capacitor (C3) satisfy: C2≤C3.

10 Claims, 8 Drawing Sheets

(52) U.S. Cl.
CPC ............... *G09G 2320/0233* (2013.01); *G09G 2330/021* (2013.01)

(58) Field of Classification Search
CPC ... G09G 2300/0819; G09G 2300/0866; G09G 2310/061; G09G 2310/08; G09G 2320/0233; G09G 2320/045; G09G 2330/021
See application file for complete search history.

(56) References Cited

FOREIGN PATENT DOCUMENTS

| | | | | | |
|---|---|---|---|---|---|
| CN | 112259050 A | * | 1/2021 | ........... | G09G 3/3225 |
| CN | 112365849 A | | 2/2021 | | |

* cited by examiner

--Prior Art--

DISPLAY PANEL AND DISPLAY DEVICE

CROSS-REFERENCE TO RELATED APPLICATION(S)

This is a Continuation Application of U.S. patent application Ser. No. 17/512,683 filed Oct. 28, 2021, which claims priority to Chinese patent application No. 202110536427.3 filed May 17, 2021, disclosures of which are incorporated herein by reference in their entireties.

FIELD

Embodiments of the present disclosure relate to the field of display technologies, and in particular, to a display panel and a display device.

BACKGROUND

An organic light-emitting diode (OLED) becomes one of research hotspots in a current display field due to the advantages of low power consumption, low cost, self-luminous, a wide viewing angle and a fast response speed. An electronic display product may adopt different refresh rates for displaying in different application scenes, for example, a driving manner with a relatively high refresh rate is adopted for driving and displaying a dynamic picture, and the smoothness of the displayed picture is ensured; or a driving manner with a relatively low refresh rate is adopted for driving and displaying a static picture, and the power consumption is reduced.

When an electronic product adopting the organic self-luminous technology is used for displaying at a low refresh rate, a potential of a gate of a drive transistor in an existing pixel circuit is changed due to the leakage current problem of other switches, and the brightness of the light-emitting element will continuously decrease and then increase when the light-emitting element is driven to emit light; therefore, the display brightness of the display panel is unstable, and the display effect and the user experience are affected.

SUMMARY

The present disclosure provides a display panel and a display device, to stabilize a potential of a gate of a drive transistor in a pixel circuit, maintain the stability of the brightness of a light-emitting element, and improve the display effect of the display panel.

In one embodiment of the present disclosure provides a display panel. The display panel includes a pixel circuit and a light-emitting element, where the pixel circuit includes a drive device, a reset device and a compensation device, where, the drive device includes a drive transistor; the reset device is connected between a reset signal terminal and the gate of the drive transistor, where the reset device includes a first double-gate transistor, the first double-gate transistor includes a first sub-transistor and a second sub-transistor, and a connection node between the first sub-transistor and the second sub-transistor is a second node; and the compensation device is connected between the gate of the drive transistor and a drain of the drive transistor, where the compensation device includes a second double-gate transistor, the second double-gate transistor includes a third sub-transistor and a fourth sub-transistor, and a connection node between the third sub-transistor and the fourth sub-transistor is a third node; and a gate of the first double-gate transistor is connected to a line of first scan signal, and is configured to receive a first scan signal, where the pixel circuit includes a second capacitor, a first pole plate of the second capacitor is connected to the line of first scan signal, and a second pole plate of the second capacitor is connected to the second node; a gate of the second double-gate transistor is connected to a line of second scan signal, and is configured to receive a second scan signal; the pixel circuit includes a third capacitor, a first pole plate of the third capacitor is connected to the line of second scan signal, and a second pole plate of the third capacitor is connected to the third node; and the second capacitor (C2) and the third capacitor (C3) satisfy: $C2 \leq C3$.

In another embodiment of the present disclosure further provides a display device, including the display panel described in any one of the embodiments.

DETAILED DESCRIPTION

Figure 1:
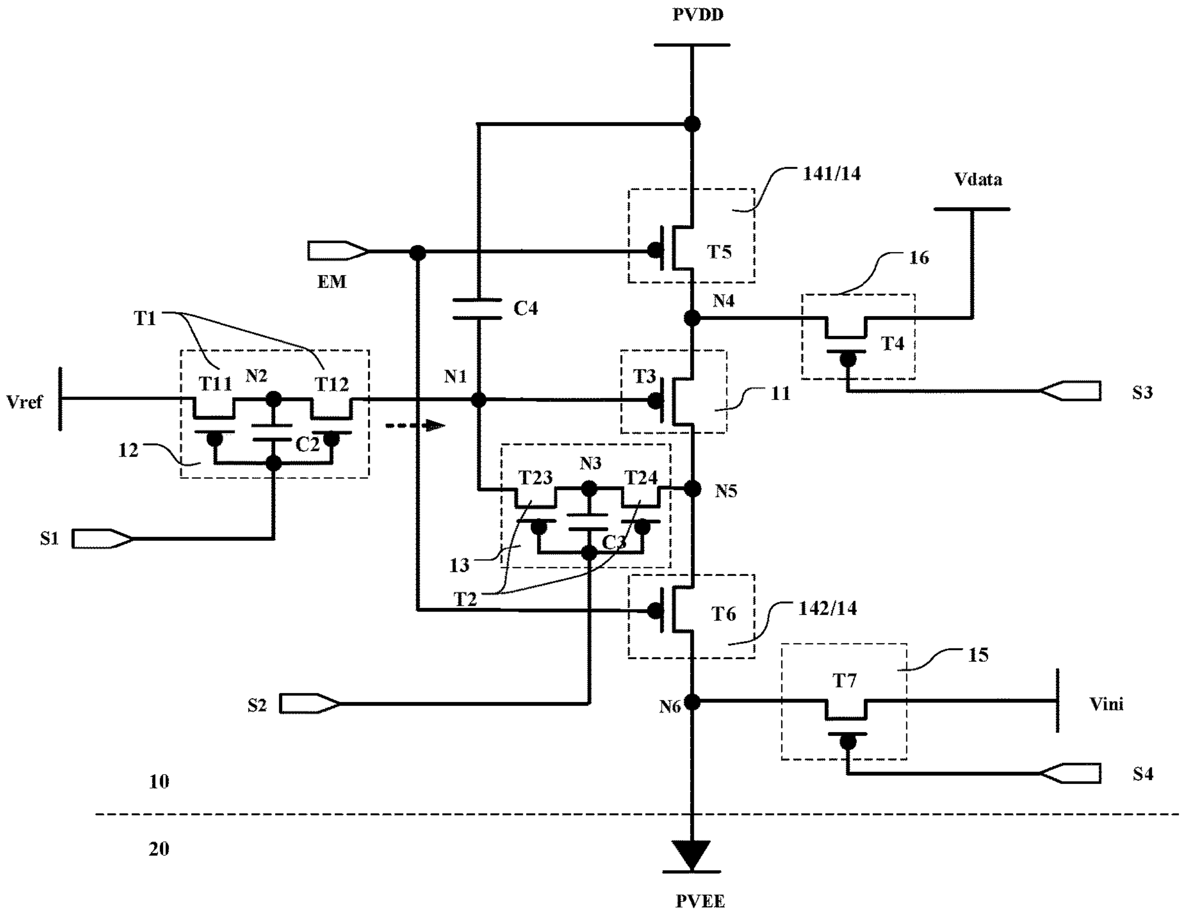
FIG. 1 is a schematic structural diagram of a pixel circuit in an existing display panel.

The present disclosure will be further described in detail in conjunction with the drawings and embodiments below. It should be understood that the embodiments described herein are merely used for explaining the present disclosure and are not intended to limit the present disclosure. In addition, it should also be noted that, for ease of description, only some, but not all, of the structures related to the present disclosure are shown in the drawings.

FIG. 1 is a schematic structural diagram of a pixel circuit in an existing display panel provided in an embodiment of the present disclosure, and referring to FIG. 1, a first node (N1) in an existing pixel circuit (10) is connected to a gate of a drive transistor (T3), one end of a first double-gate transistor (T1), and one end of a second double-gate transistor (T2), respectively, as described in the background art. In some embodiments, the pixel circuit may include a reset stage, a data written stage, and a light-emitting stage. In the reset stage, the first double-gate transistor (T1) provides a reset signal (Vref) to reset a potential of the first node (N1). In the data written stage, the second double-gate transistor (T2) writes a data signal (data) to the first node (N1), and meanwhile a threshold voltage of the drive transistor (T3) is compensated to the potential of the first node (N1). In the light-emitting stage, the drive transistor (T3) drives a light-emitting element (20) to emit light by using a threshold-compensated data signal stored in the gate, i.e., the first node (N1).

It should be noted that the double-gate transistor of the pixel circuit includes two sub-transistors, and a capacitor is simultaneously connected in parallel between a node connected between the two sub-transistors and a gate of the node. It should be understood that when the two sub-transistors are controlled to be turned on or off through a scan signal, one polar plate of the capacitor may also receive the scan signal. According to the charging and discharging principle of the polar plate of the capacitor, charge quantities on two polar plates of the capacitor may affect each other, that is, when one polar plate receives the scan signal, a potential of the other polar plate may be affected, and thus a potential of a connection node between the two sub-transistors is affected. Taken the first double-gate transistor (T1) shown in the drawings being a P-type double-gate transistor as an example, a connection node between a first sub-transistor (T11) and a second sub-transistor (T12) in the first double-gate transistor (T1) is a second node (N2). In the light-emitting stage, a gate of the first double-gate transistor (T1) is configured to be turned off after receiving a first scan signal (S1) (high level signal). In this way, a potential of the second node (N2) is raised by a second capacitor (C2) due to this high level signal, and the potential of the second node (N2) is higher than the potential of the first node (N1), a leakage current of the second sub-transistor (T12) occurs in this stage, and the potential of the first node (N1) is raised. In a similar way, the second double-gate transistor (T2), also being a P-type transistor, also has the same effect on the first node (N1) in the light-emitting stage. A potential of the third node (N3) is raised due to the third capacitor (C3) and a second scan signal (S2) (high level signal), and the potential of the third node (N3) is also higher than the potential of the first node (N1), and the third sub-transistor (T23) in the second double-gate transistor (T2) also generates a leakage current, and the potential of the first node (N1) is raised. Finally, the potential of the first node (N1) may cause a leakage current of the sub-transistor due to the potentials of the second node (N2) and the third node (N3), and thus the potential of the first node (N1) is affected. Experiments have found that in this stage, when the drive transistor (T3) drives the light-emitting element (20) to be lighted on, the light-emitting element (20) subjects to a continuous decrease and then a gradually increase in the brightness due to the change of the first node (N1), which causes the light-emitting brightness of the light-emitting element (20) unstable.

Based on the above-described problem, an embodiment of the present disclosure provides a display panel. The display panel includes a pixel circuit and a light-emitting element, where the pixel circuit includes a drive device, a reset device and a compensation device, where the drive device is configured to provide a drive current for the light-emitting element, the drive device includes a drive transistor, and a gate of the drive transistor is connected to a first node; the reset device is configured to provide a reset signal for the gate of the drive transistor, the reset device includes a first double-gate transistor, the first double-gate transistor includes a first sub-transistor and a second sub-transistor, and a connection node between the first sub-transistor and the second sub-transistor is a second node; and the compensation device is configured to compensate a threshold voltage of the drive transistor, the compensation device includes a second double-gate transistor, the second double-gate transistor includes a third sub-transistor and a fourth sub-transistor, and a connection node between the third sub-transistor and the fourth sub-transistor is a third node; where a working process of the pixel circuit includes a first stage, and in the first stage, the first double-gate transistor and the second double-gate transistor are both turned off, and where a voltage of the first node is V1, a voltage of the second node is V2, and a voltage of the third node is V3, where $(V2-V1)\times(V1-V3)>0$.

In the present embodiment, the voltage of the first node, the voltage of the second node, and the voltage of the third node are set to satisfy: $(V2-V1)\times(V1-V3)>0$, and $V3<V1$ is ensured while ensuring $V2>V1$, or $V2<V1$ is ensured while ensuring $V3>V1$. In other words, in the present embodiment, the voltage of the first node being between the voltage of the second node and the voltage of the third node may be ensured. In this way, even in a case where a voltage difference exists between the first node and the second node and a voltage difference exists between the first node and the third node, the two voltage differences are different in positive and negative, and directions of leakage currents of sub-transistors between the nodes due to the voltage differences are different. For the first node, the leakage current will flow from the second node to the first node and to the third node, or flows from the third node to the first node and to the second node. It should be understood that compared with that a leakage current flows from both the second node and the third node to the first node in the related art, the voltage of the first node is ensured to be relatively stable in the embodiments of the present disclosure. Therefore, on a basis that the pixel circuit provided in the embodiments of the present disclosure satisfies: $(V2-V1)\times(V1-V3)>0$, even in a case where the voltage of the second node and the voltage of the third node are changed due to the scan signal and the capacitance, the voltage of the first node would not be greatly affected, and thus the relative stability of the voltage of the first node can be ensured.

The embodiments of the present disclosure will be described clearly and completely in conjunction with the accompanying drawings in the embodiments of the present disclosure below.

Figure 2:
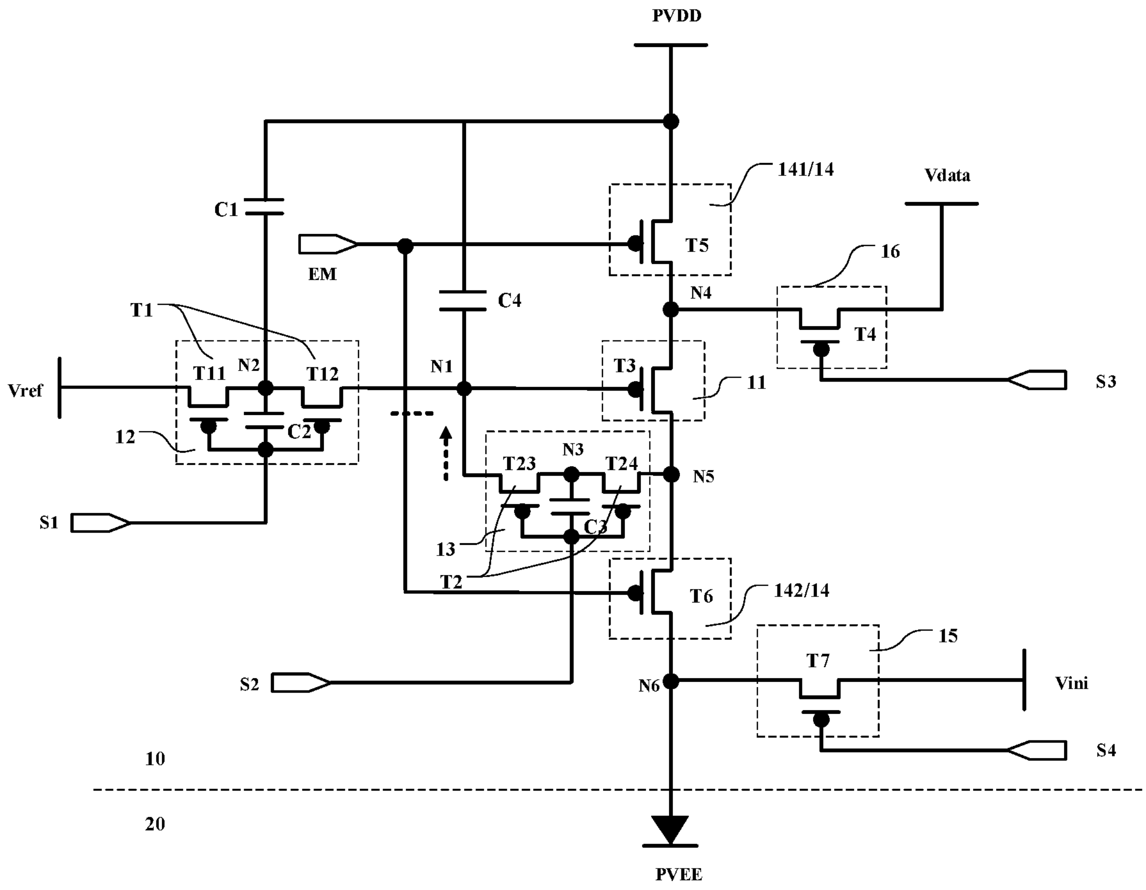
FIG. 2 is a schematic structural diagram of a pixel circuit and a light-emitting element in a display panel provided in an embodiment of the present disclosure.

FIG. 2 is a schematic structural diagram of a pixel circuit and a light-emitting element in a display panel provided in an embodiment of the present disclosure, and referring to FIG. 2, the display panel includes a pixel circuit (10) and a light-emitting element (20), where the pixel circuit (10) includes a drive device (11), a reset device (12) and a compensation device (13), where the drive device (11) is configured to provide a drive current for the light-emitting element (20), the drive device (11) includes a drive transistor (T3), and a gate of the drive transistor (T3) is connected to a first node (N1); the reset device (12) is configured to provide a reset signal for the gate of the drive transistor (T3), the reset device (12) includes a first double-gate transistor (T1), the first double-gate transistor (T1) includes a first sub-transistor (T11) and a second sub-transistor (T12), and a connection node between the first sub-transistor (T11) and the second sub-transistor (T12) is a second node (N2); and the compensation device (13) is configured to compensate a threshold voltage of the drive transistor (T3), the compensation device (13) includes a second double-gate transistor (T2), the second double-gate transistor (T2) includes a third sub-transistor (T23) and a fourth sub-transistor (T24), and a connection node between the third sub-transistor (T23) and the fourth sub-transistor (T24) is a third node (N3); where a working process of the pixel circuit (10) includes a first stage, and in the first stage, the first double-gate transistor (T1) and the second double-gate transistor (T2) are both turned off, and where a voltage of the first node (N1) is V1, a voltage of the second node (N2) is V2, and a voltage of the third node (N3) is V3, where (V2−V1)×(V1−V3)>0.

Further, in this pixel circuit, the reset device (12) is connected between a terminal of reset signal (Vref) and the gate of the drive transistor (T3), one end of the first double-gate transistor (T1) is connected to the terminal of reset signal (Vref), and another end is connected to the gate of the drive transistor (T3); the compensation device (13) is connected between the gate of the drive transistor (T3) and a drain of the drive transistor (T3), one end of the second double-gate transistor (T2) is connected to the gate of the drive transistor (T3), and another end is connected to the drain of the drive transistor (T3).

Furthermore, in the present embodiment, the pixel circuit (10) is connected to a terminal of first power supply voltage signal (PVDD), and is configured to receive a first power supply voltage signal, and the first power supply voltage signal is a constant high level signal. A gate of the first double-gate transistor (T1) is connected to a line of first scan signal (S1), and is configured to receive a first scan signal. The pixel circuit (10) includes a second capacitor (C2), a first pole plate of the second capacitor (C2) is connected to the line of first scan signal (S1), and a second pole plate of the second capacitor (C2) is connected to the second node (N2). A gate of the second double-gate transistor (T2) is connected to a line of second scan signal (S2), and is configured to receive a second scan signal. The pixel circuit (10) includes a third capacitor (C3), a first pole plate of the third capacitor (C3) is connected to the line of second scan signal (S2), and a second pole plate of the third capacitor (C3) is connected to the third node (N3).

Figure 3:
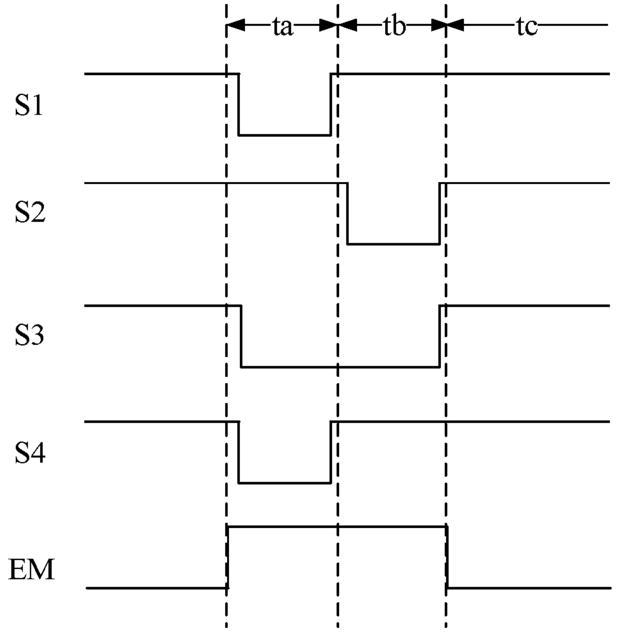
FIG. 3 is a timing diagram of a drive signal of a pixel circuit provided in an embodiment of the present disclosure.

FIG. 3 is a timing diagram of a drive signal of a pixel circuit provided in an embodiment of the present disclosure. Referring first to FIG. 2 and FIG. 3, function devices and driving processes of the pixel circuit in embodiments of the present disclosure are introduced. It should be noted that transistors (T1-T7) in the pixel circuit of the present embodiment adopt P-type transistors as an example, and the transistors are turned off at a high level and turned on at a low level when a control signal is supplied to gates of the P-type transistors. Besides the drive device (11), the reset device (12) and the compensation device (13), the pixel circuit further includes a light-emitting control device (14), an initialization device (15) and a data written device (16), where the light-emitting control device (14) includes a first light-emitting control device (141) and a second light-emitting control device (142). The first light-emitting control device (141) includes a fifth transistor (T5), the second light-emitting control device (142) includes a sixth transistor (T6), the initialization device (15) includes a seventh transistor (T7), and the data written device (16) includes a fourth transistor (T4). Gates of the fifth transistor (T5) and the sixth transistor (T6) are connected to a terminal of light-emitting control signal (EM). One end of the seventh transistor (T7) is connected to a terminal of initialization signal (Vini), and another end of the seventh transistor (T7) is connected to an anode of the light-emitting element (20); one end of the fourth transistor (T4) is connected to a terminal of data signal (Vdata), and another end of the fourth transistor (T4) is connected to the drive device (11), namely a first end of the drive transistor (T3). In some embodiments, other connections between the function devices or transistors are shown in FIG. 2 and are not repeated here.

In some embodiments, the driving process of the pixel circuit includes an initialization (reset) stage (ta), a data written stage (tb), and a light-emitting stage (tc). In the initialization (reset) stage ta, the first scan signal (S1) jumps from the high level to the low level, in this way, the first double-gate transistor (T1) is turned on, and the reset signal (Vref) is written into the first node (N1); and meanwhile, a fourth scan signal S4 jumps from the high level to the low level, at which time the seventh transistor (T7) is turned on, and the initialization signal (Vini) is written to an anode of the light-emitting element (20). This initialization (reset) stage is used for resetting or initializing the first node (N1) and for resetting or initializing the anode of the light-emitting element (20), to avoid that a voltage signal written in a previous frame would affect the first node (N1) and the anode of the light-emitting element (20).

In the data written (threshold grabbing) stage (tb), a third scan signal (S3) jumps from the high level to the low level and the fourth transistor (T4) is turned on, meanwhile, the second scan signal (S2) jumps from the high level to the low level and the second double-gate transistor (T2) is turned on. A data signal (Vdata) flows from the fourth transistor (T4), the drive transistor (T3) and the second double-gate transistor (T2) sequentially into the first node (N1), and since a voltage of the fourth node N4 is Vdata, when the voltage of the first node (N1) reaches Vdata−Vth, where Vth is the threshold voltage of the drive transistor (T3), the drive transistor (T3) is turned off. That is, in this stage, a threshold-compensated data voltage signal (Vdata−Vth) is written into the first node (N1).

In the light-emitting stage (tc), the light-emitting control signal (EM) jumps from the high level to the low level, in this way, the fifth transistor (T5) and the sixth transistor (T6) are turned on, a path is formed between the terminal of first power supply voltage signal (PVDD) and a second power supply voltage signal terminal (PVEE), the light-emitting element (20) emits light, and a magnitude of a light-emitting current is controlled by a potential of the gate of the drive transistor (T3). Since the voltage stored by the first node (N1) in a previous stage is the Vdata-Vth, the voltage of the third node (N3) is slightly higher than a voltage of the second power supply voltage signal terminal (PVEE), and a current (I) passing through the drive transistor (T3) is expressed as: I=K(N2−N1−Vth)=K(PVDD−Vdata). It should be understood that a voltage stored in the first node (N1) is the higher, the light-emitting current is the larger, and the light-emitting brightness of the light-emitting element (20) is the brighter, that is, the voltage of the first node (N1) may affect the light-emitting brightness of the light-emitting element (20).

Based on the driving process of the above pixel circuit, it should be noted that in the embodiments of the present disclosure, in the first stage, the voltage of the first node (N1), the voltage of the second node (N2) and the voltage of the third node (N3) are set to satisfy: (V2−V1)×(V1−V3)>0, and the first stage is a time period when the first double-gate transistor (T1) and the second double-gate transistor (T2) are turned off. It can be seen from the driving process of the pixel circuit described above that the first double-gate transistor (T1) and the second double-gate transistor (T2) at least need to be turned off in the light-emitting stage. According to the present embodiment, the voltage of the first node (N1), the voltage of the second node (N2), and the voltage of the third node (N3) are set to satisfy: (V2−V1)×(V1−V3)>0, and when the first double-gate transistor (T1) and the second double-gate transistor (T2) are turned off, a turn-off signal is prevented from affecting the second node (N2) and the third node (N3), and further affecting the voltage of the first node (N1).

When V2>V1 and V3<V1, in this way, since V2>V1, a voltage difference exists on two ends of the second sub-transistor (T12) between the second node (N2) and the first node (N1), and in a case where a leakage current occurs in the second sub-transistor (T12), a flowing direction of the leakage current flows from the second node (N2) to the first node (N1). Meanwhile, since V3<V1, a voltage difference exists on two ends of the third sub-transistor (T23) between the third node (N3) and the first node (N1), and in a case where a leakage current occurs in the third sub-transistor (T23), a flowing direction of the leakage current flows from the first node (N1) to the third node (N3). In this way, for the first node (N1), the voltage of the first node (N1) is less affected by the leakage currents of the transistors, and thus the voltage of the first node (N1) may remain substantially stable. When V2<V1 and V3>V1, since V2<V1, a voltage difference exists on two ends of the second sub-transistor (T12) between the second node (N2) and the first node (N1), and in a case where a leakage current occurs in the second sub-transistor (T12), the flowing direction of the leakage current flows from the first node (N1) to the second node (N2). Meanwhile, since V3>V1, a voltage difference exists on two ends of the third sub-transistor (T23) between the third node (N3) and the first node (N1), and in a case where a leakage current occurs in the third sub-transistor (T23), the flowing direction of the leakage current flows from the third node (N3) to the first node (N1). In this way, for the first node (N1), the voltage of the first node (N1) is less affected by the leakage current of the transistor, and thus the voltage of the first node (N1) may remain substantially stable.

Based on a same principle, it should be understood that the first double-gate transistor (T1) and the second double-gate transistor (T2) are set to be N-type transistor, the voltage of the first node (N1) is also affected by the second node (N2) and the third node (N3). The gate of the first double-gate transistor (T1) and the gate of the second double-gate transistor (T2) each is a low level signal when the first double-gate transistor (T1) and the second double-gate transistor (T2) are turned off, and potentials of the second node (N2) and the third node (N3) are lower than the potential of the first node (N1) under the effect of the capacitance, and the leakage currents are generated by the second sub-transistor (T12) and the third sub-transistor (T23), and directions of the leakage currents are a direction flowing from the first node (N1) to the second node (N2) and a direction flowing from the first node (N1) to the third node (N3), which causes that the potential of the first node (N1) is reduced. Regarding this situation, in the present embodiment, the voltage of the first node (N1), the voltage of the second node (N2), and the voltage of the third node (N3) are set to satisfy: $(V2-V1)\times(V1-V3)>0$, V2>V1 and V3<V1, or V2<V1 and V3>V1 may also be ensured, a leakage current between the first node (N1), the second node (N2) and the third node (N3) flows from the second node (N2) to the third node (N3) via the first node (N1), or flows from the third node (N3) to the second node (N2) via the first node (N1). In this way, the first node (N1) is less affected by the leakage currents of the transistors, and thus the voltage of the first node (N1) may remain substantially stable as well.

In one embodiment, the voltage of the first node (N1), the voltage of the second node (N2), and the voltage of the third node (N3) are set to satisfy: $(V2-V1)\times(V1-V3)>0$, with continued reference to FIG. 2, in one embodiment of the present disclosure, the voltage of the first node (N1), the voltage of the second node (N2), and the voltage of the third node (N3) are set to satisfy: V2<V1<V3. The pixel circuit (10) is set to include a first capacitor (C1), a first pole plate of the first capacitor (C1) is connected to the terminal of first power supply voltage signal (PVDD), and a second pole plate of the first capacitor is connected to the second node (N2).

It should be understood that in the pixel circuit of the present embodiment, since the second node (N2) is set to be electrically connected to the terminal of first power supply voltage signal (PVDD) through the first capacitor (C1), and the terminal of first power supply voltage signal (PVDD) is a constant high level signal, and a potential of the second node (N2) may be affected by charging and discharging the capacitor pole plates of the first capacitor (C1) and the second capacitor (C2) simultaneously in the first stage. In the first stage, the first scan signal (S1) jumps from the low level (VGL) to the high level (VGH), and the first double-gate transistor (T1) is turned off; meanwhile, the first capacitor (C1) and the second capacitor (C2) are connected in series, and the first capacitor (C1) is connected to the constant high level signal, and the potential V2 of the second node (N2) is expressed as: $V2=(VGH-VGL)\times C2/(C1+C2)+Vref1$. As can be seen from this formula, compared with a condition that the first capacitor (C1) is not provided, the potential of the second node (N2) is properly reduced, and the potential of the first node (N1) is between the potential of the second node (N2) and the potential of the third node (N3), that is, V2<V1<V3, and therefore, a situation that the leakage current flows from the second node (N2) into the first node (N1) and thus it is avoided that the potential of the first node (N1) is affected to change, further, the brightness of the light-emitting element (20) can be ensured to be relatively stable.

Further, in the embodiments of the present disclosure, the first capacitor (C1) and the second capacitor (C2) may also be set to satisfy: C1>C2. According to the above potential formula of the second node (N2), it can be seen that the first capacitor (C1) is larger, and the potential of the second node (N2) is smaller, in this way, the potential of the second node (N2) may be reduced as much as possible, and the leakage current of the second sub-transistor (T12) flows towards the second node (N2), and the potential of the first node (N1) being changed is avoided.

Further, in an embodiment, in the embodiments of the present disclosure, the second capacitor (C2) and the third capacitor (C3) may be set to satisfy: C2≤C3. As shown in FIG. 2, as an example, since the second double-gate transistor (T2) is the P-type transistor, in the first stage, the second scan signal (S2) jumps from the low level to the high level, and the second double-gate transistor (T2) is turned off. In this way, under the effect of the third capacitor (C3), the potential of the third node (N3) is raised by the second scan signal (S2). Since a relationship between a voltage U, a capacitance C and a charge quantity Q is U=Q/C, the smaller the voltage U is, and the larger the capacitance C is. In the present embodiment, since it is set that C2≤C3, it can be ensured that the potential of the third node (N3) is raised higher, and that the first node (N1) and the third node (N3) satisfy: V1<V3.

In conclusion, in the embodiment shown in the FIG. 2, the first capacitor (C1) is disposed between the terminal of first power supply voltage signal (PVDD) and the second node (N2), the first capacitor (C1) is set to be larger than the second capacitor (C2), and meanwhile, the second capacitor (C2) is set to be larger than or equal to the third capacitor (C3), and the voltage of the first node (N1), the voltage of the second node (N2), and the voltage of the third node (N3) satisfy: V2<V1<V3, and the leakage current among the first node (N1), the second node (N2) and the third node (N3)

flows from the third node (N3) to the second node (N2) via the first node (N1), and a situation is avoided that the first node (N1) receives too much leakage current, the potential of the first node (N1) is increased, and the stability of the light-emitting brightness of the light-emitting element is affected.

Figure 4:
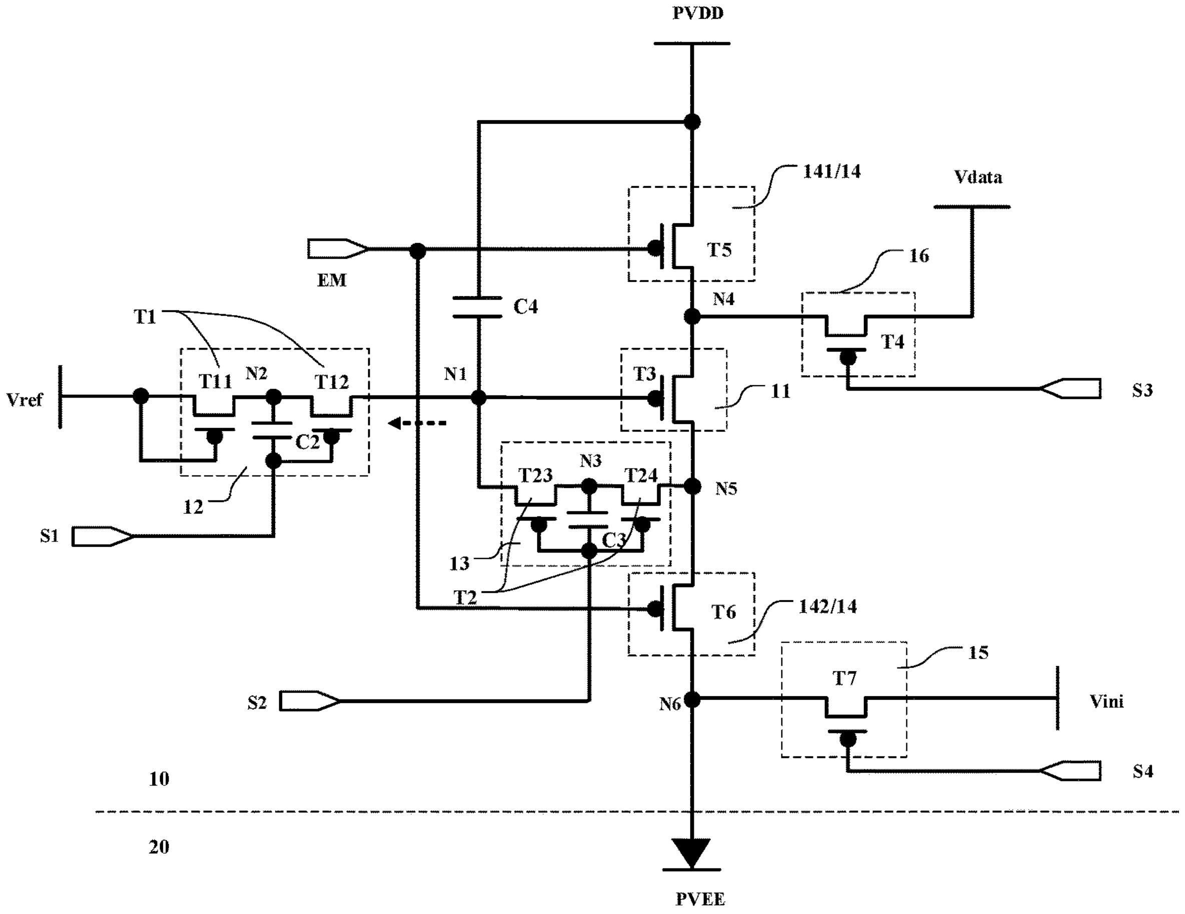
FIG. 4 is a schematic structural diagram of a pixel circuit and a light-emitting element in a display panel provided in another embodiment of the present disclosure.

In another embodiment of the present disclosure, similarly, the voltage of the first node (N1), the voltage of the second node (N2), and the voltage of the third node (N3) may in an embodiment be set to satisfy: V2<V1<V3. FIG. 4 is a schematic structural diagram of a pixel circuit and a light-emitting element in a display panel provided in another embodiment of the present disclosure. Referring to FIG. 4, in the present embodiment, one end of the first sub-transistor (T11) is in an embodiment set to be connected to the terminal of reset signal (Vref), and another end of the first sub-transistor (T11) is connected to the second node (N2), and in the first stage, the first sub-transistor (T11) is kept in an ON state, and the second sub-transistor (T12) is kept in an OFF state.

It should be understood that the first sub-transistor (T11) is set to be kept in the ON state in the first stage, and the second node (N2) always receives a signal from the terminal of reset signal (Vref) in this stage, and a potential of the second node (N2) is a reset signal at low level. In this way, the potential V2 of the second node (N2) is lower than the potential V1 of the first node (N1).

In one embodiment, the above-described first sub-transistor (T11) is kept in the ON state in the first stage, as shown in FIG. 4, a gate of the first sub-transistor (T11) may be set to be connected to a line of reset signal (Vref) to receive a reset signal in the present embodiment. It should be understood that since the first sub-transistor (T11) is the P-type transistor and the line of reset signal (Vref) is a low level signal, when the gate of the first sub-transistor (T11) is connected to the line of reset signal (Vref), the first sub-transistor (T11) is always kept in the ON state under the control of the effective reset signal, that is, it is achieved that the second node (N2) receives the reset signal in the first stage, and the potential of the second node (N2) is lower than the potential of the first node (N1).

Figure 5:
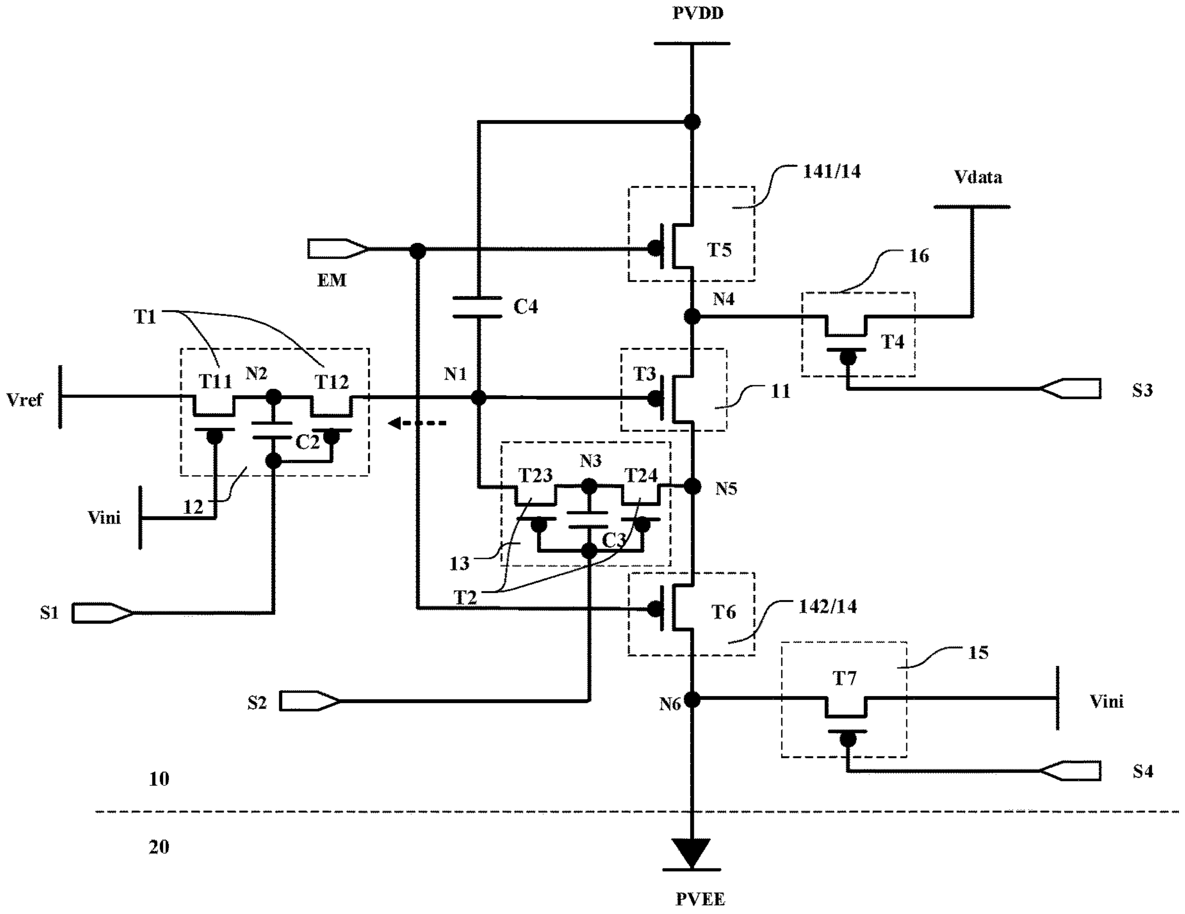
FIG. 5 is a schematic structural diagram of a pixel circuit and a light-emitting element in still a display panel provided in another embodiment of the present disclosure.

FIG. 5 is a schematic structural diagram of a pixel circuit and a light-emitting element in still a display panel provided in another embodiment of the present disclosure. Based on a same concept, the pixel circuit shown in FIG. 5 further includes an initialization device (15). The initialization device (15) is connected between the terminal of initialization signal (Vini) and the light-emitting element (20), and the initialization device (15) is configured to provide an initialization signal for the light-emitting element (20). The gate of the first sub-transistor (T11) may be set to be connected to a line of initialization signal (Vini) to receive an initialization signal.

The same as above is that, the effective signals of the line of initialization signal (Vini) and the line of reset signal (Vref) are both low level signals, and in order to ensure that the first sub-transistor (T11) is kept in the ON state in the first stage and the second node (N2) is configured to receive the reset signal (Vref), the first sub-transistor (T11) may be controlled to be kept in the ON state by using an initialization signal with a low level, namely as described as above, the gate of the first sub-transistor (T11) may be set to be connected to the terminal of initialization signal (Vini).

In addition to the structure of the pixel circuit may be changed to make the potential of the first node (N1), the potential of the second node (N2), and the potential of the third node (N3) satisfy: V2<V1<V3 in the above embodiments, and in other embodiments of the present disclosure, the potential of the first node (N1), the potential of the second node (N2), and the potential of the third node (N3) may also set to satisfy: V2>V1>V3.

Figure 6:
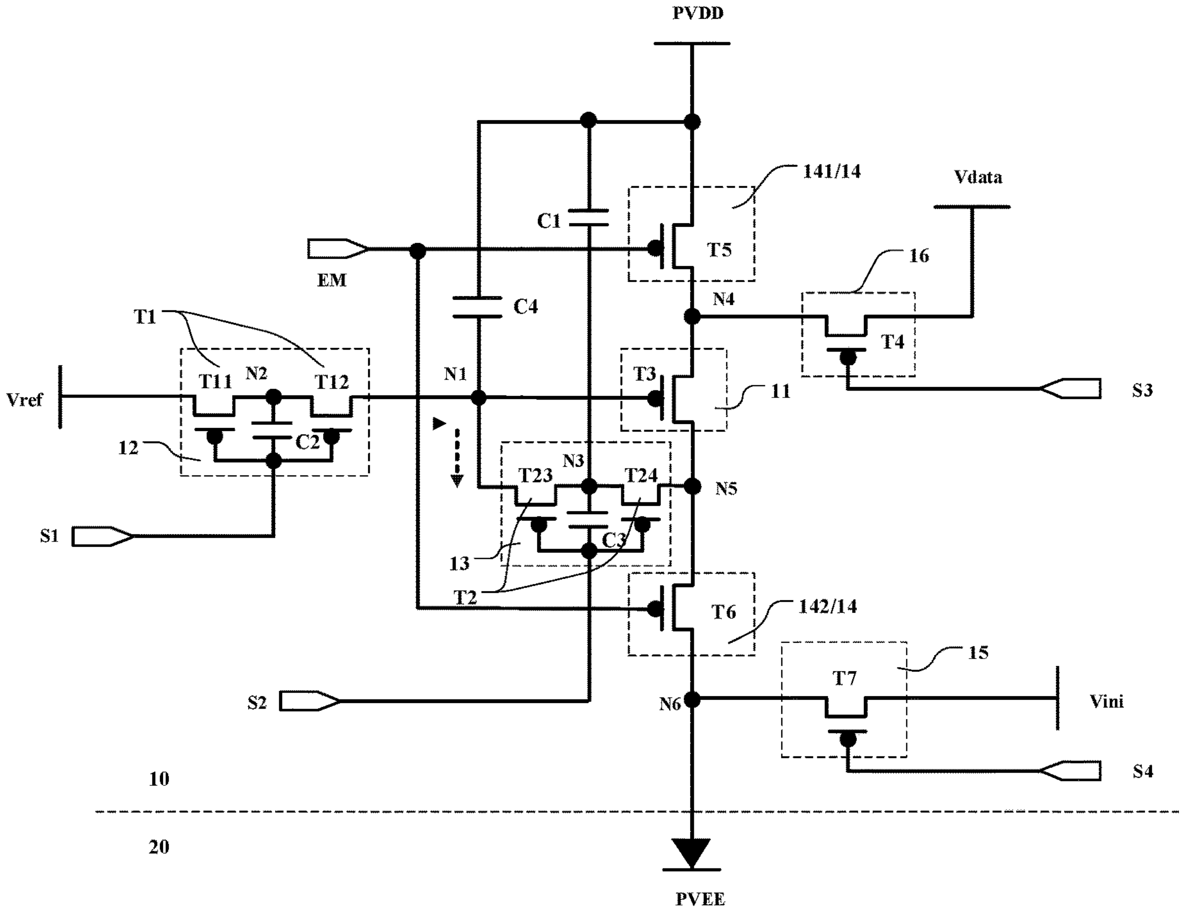
FIG. 6 is a schematic structural diagram of a pixel circuit and a light-emitting element in still a display panel provided in another embodiment of the present disclosure.

FIG. 6 is a schematic structural diagram of a pixel circuit and a light-emitting element in still a display panel provided in another embodiment of the present disclosure, and referring to FIG. 6, firstly, in the pixel circuit, a gate of the first double-gate transistor (T1) is connected to a line of first scan signal (S1), and is configured to receive a first scan signal. The pixel circuit (10) includes a second capacitor (C2), a first pole plate of the second capacitor (C2) is connected to the line of first scan signal (S1), and a second pole plate of the second capacitor (C2) is connected to the second node (N2). A gate of the second double-gate transistor (T2) is connected to a line of second scan signal (S2), and is configured to receive a second scan signal. The pixel circuit (10) includes a third capacitor (C3), a first pole plate of the third capacitor (C3) is connected to the line of second scan signal (S2), and a second pole plate of the third capacitor (C3) is connected to the third node (N3). The pixel circuit (10) may be set to be connected to a terminal of first power supply voltage signal (PVDD), and be configured to receive a first power supply voltage signal, and the first power supply voltage signal is a constant high level signal; the pixel circuit (10) includes a first capacitor (C1), a first pole plate of the first capacitor (C1) is connected to the terminal of first power supply voltage signal (PVDD), and a second pole plate of the first capacitor (C1) is connected to the third node (N3).

In a similar way, two pole plates of the first capacitor (C1) are respectively connected to the terminal of first power supply voltage signal and the third node (N3), and the first capacitor (C1) and the third capacitor (C3) form a series structure; since one end of the first capacitor (C1) is connected to the terminal of first power supply voltage signal (PVDD) (constant high level signal), compared with a condition that the first capacitor (C1) is not provided, the potential of the third node (N3) is properly reduced, and the potential of the first node (N1) is between the potential of the third node (N3) and the potential of the second node (N2), that is, V2>V1>V3, and therefore, a situation is avoided that the leakage current flowing from the third node (N3) into the first node (N1) and the potential of the first node (N1) is affected to change, and hence, the brightness of the light-emitting element (20) can be ensured to be relatively stable.

Similarly, according to a principle that the larger the first capacitor (C1) is, the lower the potential V3 of the third node (N3) is, in the present embodiment, the first capacitor (C1) and the third capacitor (C3) may be set to satisfy: C1>C3. In this way, the potential of the third node (N3) may be reduced as much as possible, and the leakage current of the third sub-transistor (T23) flows towards the third node (N3), and the potential of the first node (N1) being changed is avoided.

In addition, according to a formula of U=Q/C, where the capacitance C is the larger, the voltage U is the smaller, the second capacitance C2 and the third capacitance C3 may be further set to satisfy: C2≥C3. In this way, it can be ensured that the potential of the second node (N2) is raised higher, and thus the first node (N1) and the second node (N2) satisfy: V1<V2.

Figure 7:
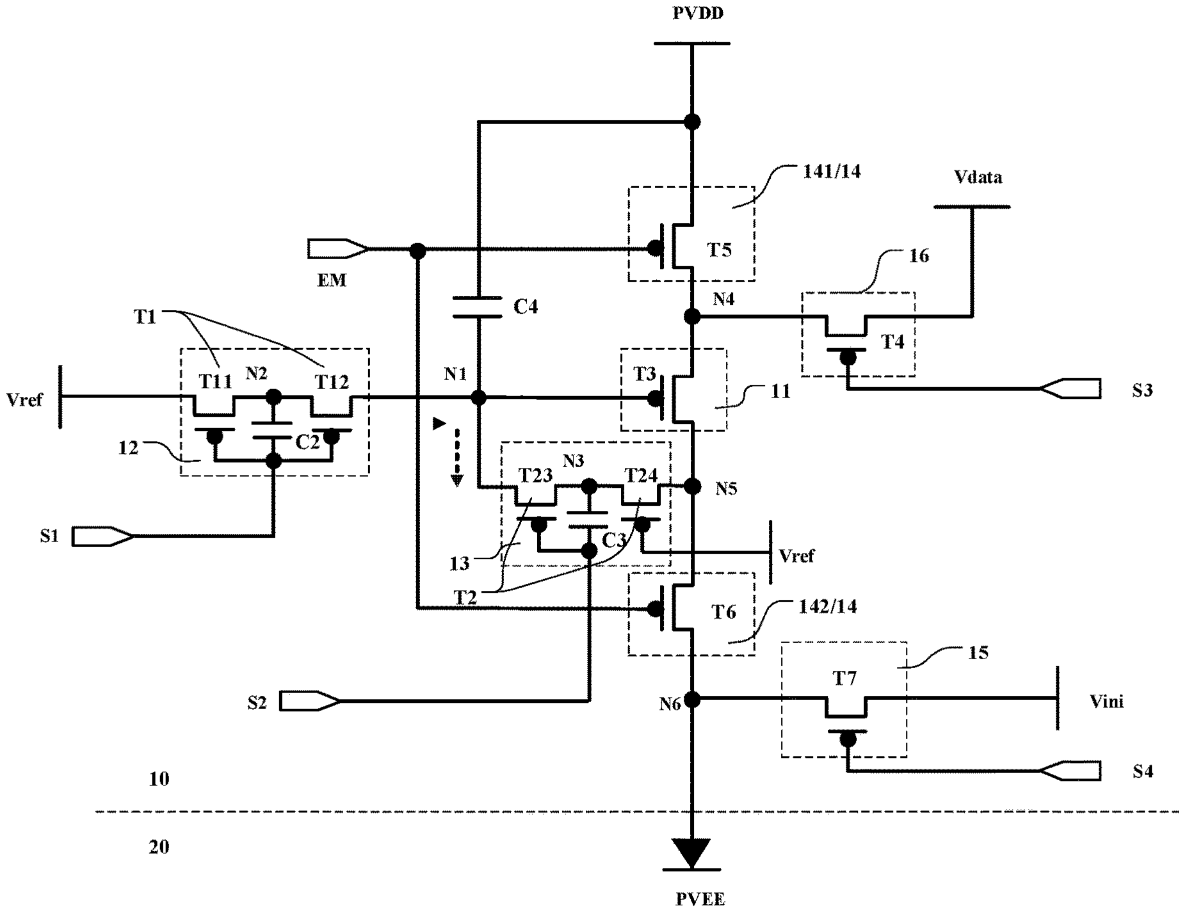
FIG. 7 is a schematic structural diagram of a pixel circuit and a light-emitting element in still a display panel provided in another embodiment of the present disclosure.

In another embodiment of the present disclosure, similarly, the voltage of the first node (N1), the voltage of the second node (N2), and the voltage of the third node (N3) may in an embodiment be set to satisfy: V2>V1>V3. FIG. 7 is a schematic structural diagram of a pixel circuit and a light-emitting element in still a display panel provided in another embodiment of the present disclosure, referring to FIG. 7, in the present embodiment, one end of the fourth sub-transistor (T24) is in an embodiment set to be connected to the third node (N3), and another end of the fourth sub-transistor (T24) is connected to the drain of the drive transistor (T3), and in the first stage, the fourth sub-transistor (T24) is kept in the ON state, and the third sub-transistor (T23) is kept in the OFF state.

In a similar way, the fourth sub-transistor (T24) is set to be kept in the ON state in the first stage, and the third node (N3) is always equal to the potential of a drain of the drive transistor (T3) in this stage, and since when the first double-gate transistor (T1) and the second double-gate transistor (T2) are both turned off, that is, the reset device (12) and the compensation device (13) are both turned off, the pixel circuit (10) is in the light-emitting stage, and the drive transistor (T3) is in a non-saturated state in the light-emitting stage, the potential of the drain of the drive transistor (T3) is generally a lower level potential (the drive transistor is the P-type transistor), and In this way, the third node (N3) is a lower level potential, which achieves that the potential of the third node (N3) is lower than the potential of the first node (N1).

In one embodiment, the above-described fourth sub-transistor (T24) is kept in the ON state in the first stage, as shown in FIG. 7, a gate of the fourth sub-transistor (T24) may be set to be connected to a line of reset signal (Vref) to receive a reset signal in the present embodiment. It should be understood that since the fourth sub-transistor (T24) is the P-type transistor and the line of reset signal (Vref) is the low level signal, when the gate of the fourth sub-transistor (T24) is connected to the line of reset signal (Vref), the fourth sub-transistor (T24) is always kept in the ON state under the control of an effective reset signal, that is, it is achieved that the third node (N3) is always kept consistent with the potential of the drain of the drive transistor (T3) in the first stage, and the potential of the third node (N3) is lower than the potential of the first node (N1).

Figure 8:
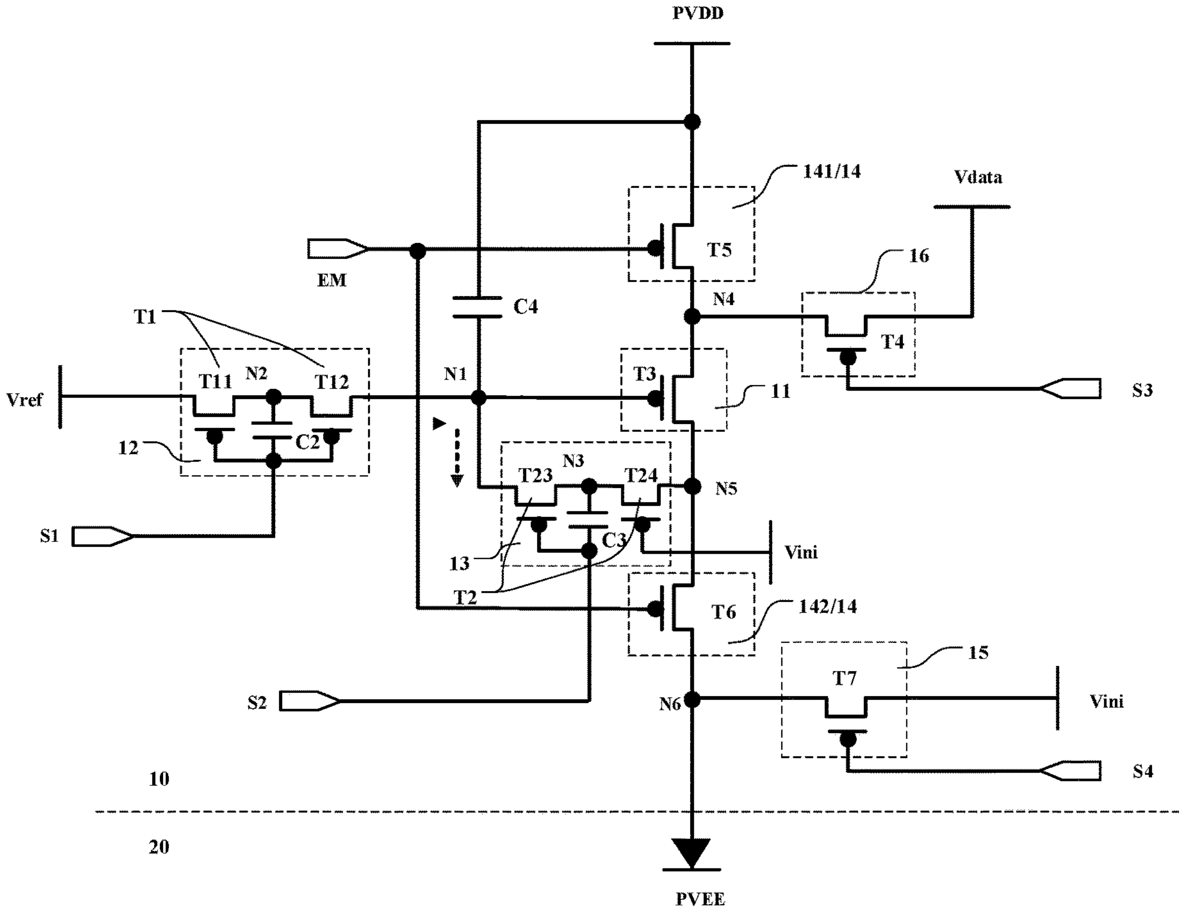
FIG. 8 is a schematic structural diagram of a pixel circuit and a light-emitting element in still a display panel provided in another embodiment of the present disclosure.

FIG. 8 is a schematic structural diagram of a pixel circuit and a light-emitting element in still a display panel provided in another embodiment of the present disclosure. Based on the same concept, the pixel circuit shown in FIG. 8 further includes an initialization device (15). The initialization device (15) is connected between the terminal of initialization signal (Vini) and the light-emitting element (20), and the initialization device (15) is configured to provide an initialization signal for the light-emitting element (20). The gate of the fourth transistor (T24) is connected to the line of initialization signal (Vini) to receive an initialization signal.

The same as above is that, the effective signals of the line of initialization signal (Vini) and the line of reset signal (Vref) are both low level signals, and in order to ensure that the fourth sub-transistor (T24) is kept in the ON state in the first stage, the potential of the third node (N3) is kept consistent with the potential of the drain of the drive transistor (T3), the fourth sub-transistor (T24) may be controlled to be kept in the ON state by using an initialization signal (Vini) at a low level, namely, the gate of the fourth sub-transistor (T24) may be set to be connected to the terminal of initialization signal (Vini) as described above.

On the basis of the various embodiments described above, the present disclosure also limits a transmission time of a leakage current flowing into the first node (N1) from the second node (N2) and the third node (N3). In the first stage, a transmission time of a leakage current between the second node (N2) and the first node (N1) may be set to be t1, and a transmission time of a leakage current between the third node (N3) and the first node (N1) may be set to be t2. A smaller one of t1 and t2 is t0, and a frame refreshing frequency of the display panel is M HZ, where $t0>1/M$.

It should be understood that the frame refresh frequency of an image of the display panel is M HZ, and time of one image frame is 1/M. In the present embodiment, a smaller one of the transmission time of the leakage current from the second node (N2) to the first node (N1) and the transmission time of the leakage current from the third node (N3) to the first node (N1) is set to be greater than or equal to the time of one image frame of the display panel, that is, to set $t0>1/M$. In this way, in the light-emitting stage of the one image frame, the first node (N1) always participates in a leakage current process of the second node (N2) and in a leakage current process of the third node (N3). That is, the leakage current flows from the second node (N2) to the first node (N1) and then to the third node (N3), or the leakage current flows from the third node (N3) to the first node (N1) and then to the second node (N2). In this way, the first node (N1) is always in a balanced state of the leakage current, and the potential of the first node (N1) changes relatively less or even unchanged, and the stability of the light-emitting brightness of the light-emitting element can be ensured.

Further, in the embodiments of the present disclosure, it may be also set that: $0\leq|t1-t2|\leq t0\times1/5$. In this way, a difference between t1 and t2 is relatively small. Relatively speaking, it can ensure that t0 is relatively large in the whole pixel driving process, and the balance time of the leakage current of the first node (N1) is relatively longer, and correspondingly, the frame refresh frequency of the image, M HZ, of the display panel is also relatively small, which is conducive to the display panel to achieve the low-frequency drive display.

Figure 9:
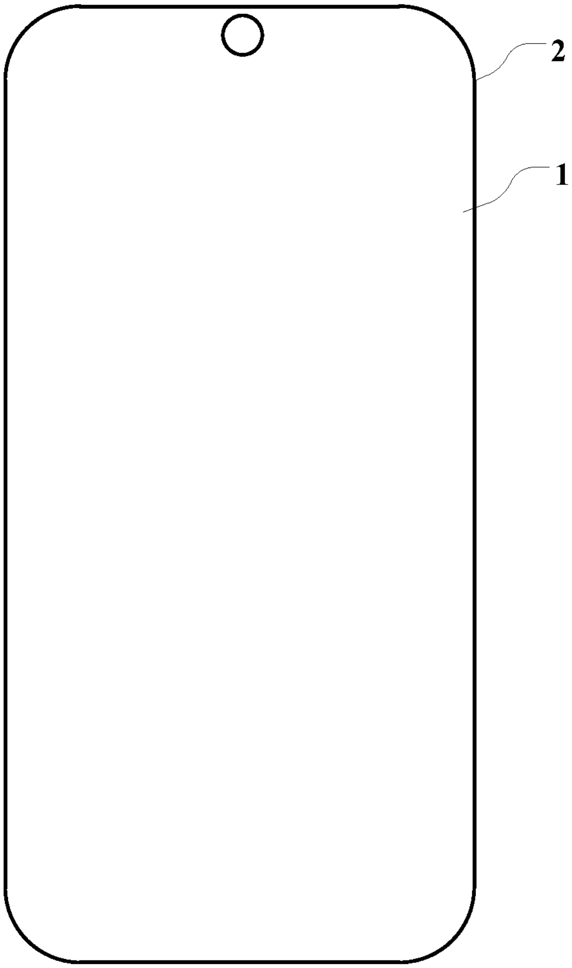
FIG. 9 is a schematic structural diagram of a display device provided in an embodiment of the present disclosure.

An embodiment of the present disclosure further provides a display device. FIG. 9 is a schematic structural diagram of a display device provided in an embodiment of the present disclosure. Referring to FIG. 9, the display device (2) may include any display panel (1) provided in the above-described embodiments. In some embodiments, since the display device includes the above-described display panel, the display device has same or corresponding effects of the above-described display panel. It should be noted that the display device further includes other devices for supporting normal operations of the display device. The display device may be a mobile phone, a tablet, a computer, a TV, a wearable smart device and the like, which is not limited in the embodiments of the present disclosure.

What is claimed is:

1. A display panel, comprising:

a pixel circuit and a light-emitting element, wherein the pixel circuit comprises a drive module, a reset module and a compensation module, wherein, the drive module comprises a drive transistor;

the reset module is connected between a reset signal terminal and a gate of the drive transistor, wherein the reset module comprises a first double-gate transistor, the first double-gate transistor comprises a first sub-transistor and a second sub-transistor, and a connection node between the first sub-transistor and the second sub-transistor is a second node; and the compensation module is connected between the gate of the drive transistor and a drain of the drive transistor, wherein the compensation module comprises a second double-gate transistor, the second double-gate transistor comprises a third sub-transistor and a fourth sub-transistor, and a connection node between the third sub-transistor and the fourth sub-transistor is a third node; and a gate of the first double-gate transistor is connected to a line of first scan signal, and is configured to receive a first scan signal, wherein the pixel circuit comprises a second capacitor, a first pole plate of the second capacitor is directly connected to the line of first scan signal, and a second pole plate of the second capacitor is connected to the second node;

a gate of the second double-gate transistor is connected to a line of second scan signal, and is configured to receive a second scan signal; the pixel circuit comprises a third capacitor, a first pole plate of the third capacitor is directly connected to the line of second scan signal, and a second pole plate of the third capacitor is connected to the third node; and capacitance of the second capacitor (C2) is less than or equal to capacitance of the third capacitor (C3).

2. The display panel of claim 1, wherein one end of the first sub-transistor is connected to the reset signal terminal, and another end of the first sub-transistor is connected to the second node, and wherein a working process of the pixel circuit comprises a first stage, and in the first stage, the first sub-transistor is kept in an ON state, and the second sub-transistor is kept in an OFF state.

3. The display panel of claim 2, wherein, the pixel circuit further comprises an initialization module, and the initialization module is connected between an initialization signal terminal and the light-emitting element, and is configured to provide an initialization signal for the light-emitting element, a gate of the first sub-transistor is connected to one of a line of reset signal or a line of initialization signal;

in a case where a gate of the first sub-transistor is connected to the line of reset signal, the first sub-transistor is configured to receive a reset signal, and in a case where a gate of the first sub-transistor is connected to the line of initialization signal, the first sub-transistor is configured to receive the initialization signal.

4. The display panel of claim 1, wherein one end of the fourth sub-transistor is connected to the third node, another end of the fourth sub-transistor is connected to the drain of the drive transistor; and wherein a working process of the pixel circuit comprises a first stage, and in the first stage, the fourth sub-transistor is kept in an ON state, and the third sub-transistor is kept in an OFF state.

5. The display panel of claim 4, wherein, the pixel circuit further comprises an initialization module, and the initialization module is connected between an initialization signal terminal and the light-emitting element, and is configured to provide an initialization signal for the light-emitting element;

a gate of the fourth sub-transistor is connected to one of a line of reset signal or a line of initialization signal; in a case where the gate of the fourth sub-transistor is connected to the line of reset signal, the fourth sub-transistor is configured to receive a reset signal, and in a case where the gate of the fourth sub-transistor is connected to the line of initialization signal, the fourth sub-transistor is configured to receive the initialization signal.

6. A display device, comprising:

a display panel, and wherein the display panel comprises:

a pixel circuit and a light-emitting element, wherein the pixel circuit comprises a drive module, a reset module and a compensation module, wherein, the drive module comprises a drive transistor;

the reset module is connected between a reset signal terminal and a gate of the drive transistor, wherein the reset module comprises a first double-gate transistor, the first double-gate transistor comprises a first sub-transistor and a second sub-transistor, and a connection node between the first sub-transistor and the second sub-transistor is a second node; and the compensation module is connected between the gate of the drive transistor and a drain of the drive transistor, wherein the compensation module comprises a second double-gate transistor, the second double-gate transistor comprises a third sub-transistor and a fourth sub-transistor, and a connection node between the third sub-transistor and the fourth sub-transistor is a third node; and a gate of the first double-gate transistor is connected to a line of first scan signal, and is configured to receive a first scan signal, wherein the pixel circuit comprises a second capacitor, a first pole plate of the second capacitor is directly connected to the line of first scan signal, and a second pole plate of the second capacitor is connected to the second node;

a gate of the second double-gate transistor is connected to a line of second scan signal, and is configured to receive a second scan signal; the pixel circuit comprises a third capacitor, a first pole plate of the third capacitor is directly connected to the line of second scan signal, and a second pole plate of the third capacitor is connected to the third node; and capacitance of the second capacitor (C2) is less than or equal to capacitance of the third capacitor (C3).

7. The display device of claim 6, wherein one end of the first sub-transistor is connected to the reset signal terminal, and another end of the first sub-transistor is connected to the second node, and wherein a working process of the pixel circuit comprises a first stage, and in the first stage, the first sub-transistor is kept in an ON state, and the second sub-transistor is kept in an OFF state.

8. The display device of claim 7, wherein, the pixel circuit further comprises an initialization module, and the initialization module is connected between an initialization signal terminal and the light-emitting element, and is configured to provide an initialization signal for the light-emitting element, a gate of the first sub-transistor is connected to one of a line of reset signal or a line of initialization signal;

in a case where a gate of the first sub-transistor is connected to the line of reset signal, the first sub-transistor is configured to receive a reset signal, and in a case where a gate of the first sub-transistor is connected to the line of initialization signal, the first sub-transistor is configured to receive the initialization signal.

9. The display device of claim 6, wherein one end of the fourth sub-transistor is connected to the third node, another end of the fourth sub-transistor is connected to the drain of the drive transistor; and wherein a working process of the pixel circuit comprises a first stage, and in the first stage, the fourth sub-transistor is kept in an ON state, and the third sub-transistor is kept in an OFF state.

10. The display device of claim 9, wherein, the pixel circuit further comprises an initialization module, and the initialization module is connected between an initialization signal terminal and the light-emitting element, and is configured to provide an initialization signal for the light-emitting element;

a gate of the fourth sub-transistor is connected to one of a line of reset signal or a line of initialization signal; in a case where the gate of the fourth sub-transistor is connected to the line of reset signal, the fourth sub-transistor is configured to receive a reset signal, and in a case where the gate of the fourth sub-transistor is connected to the line of initialization signal, the fourth sub-transistor is configured to receive the initialization signal.

* * * * *